Sept. 13, 1960

F. V. ATKESON 2,952,097

ANNEALING GLASS

Original Filed May 18, 1953

INVENTOR.
FLORIAN V. ATKESON
BY
Oscar L. Spencer
ATTORNEY

Sept. 13, 1960 F. V. ATKESON 2,952,097
ANNEALING GLASS

Original Filed May 18, 1953 5 Sheets-Sheet 3

INVENTOR.
FLORIAN V. ATKESON
BY
Oscar L. Spencer
ATTORNEY

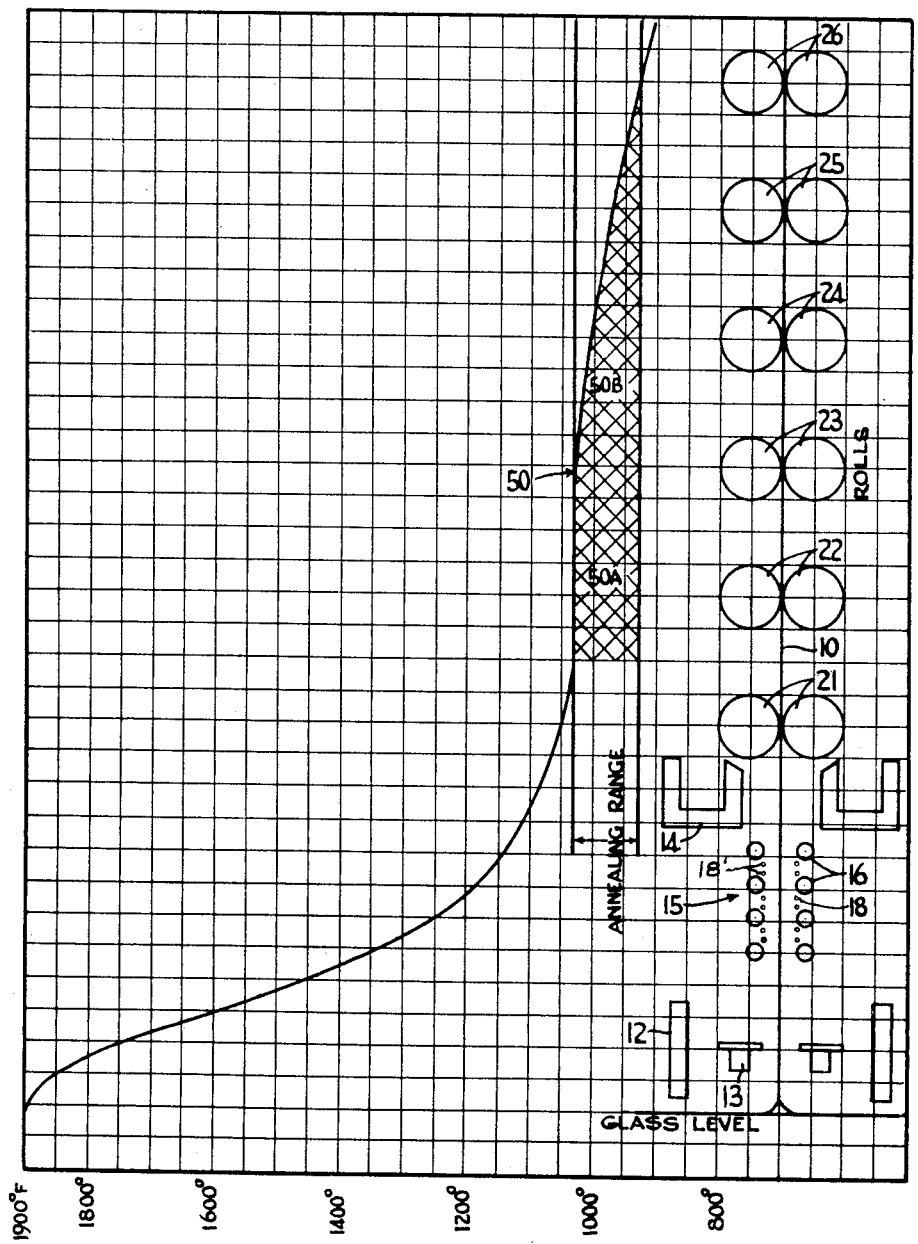

Sept. 13, 1960  F. V. ATKESON  2,952,097
ANNEALING GLASS

Original Filed May 18, 1953  5 Sheets-Sheet 5

INVENTOR.
FLORIAN V. ATKESON
BY
Oscar L. Spencer
ATTORNEY

United States Patent Office 2,952,097
Patented Sept. 13, 1960

2,952,097
ANNEALING GLASS

Florian V. Atkeson, Springdale, Pa., assignor to Pittsburgh Plate Glass Company, Allegheny County, Pa., a corporation of Pennsylvania Original application May 18, 1953, Ser. No. 355,815, now Patent No. 2,774,190, dated Dec. 18, 1956. Divided and this application Jan. 24, 1956, Ser. No. 560,978

6 Claims. (Cl. 49—17)

This invention relates in general to the annealing of glass and more specifically to apparatus for substantially uniform control of the temperature of the cooling glass as it passes through the annealing range in order to obtain the glass characteristics desired.

A specific application of the invention is shown in connection with a conventional window glass vertical drawing machine wherein the glass anneal is improved by controlling a portion of the temperature change in the glass as it moves from the molten state to the finished product in the controlled manner taught by the invention. The application of the invention to a horizontally disposed annealing lehr is also taught by a modification of the principal disclosure.

The art of annealing glass is acknowledged to be old and many disclosures are found in the prior art patents of method and apparatus used in attempts to anneal glass under various conditions. Theoretical optimum annealing curves for various glass compositions and shapes are readily calculated but great difficulties have heretofore been encountered in obtaining the desired results in practice. These difficulties have been greatly increased when attempting to obtain the desired results in a window glass drawing machine where precise temperature control is negatived by the necessary structural characteristics of such machines. This is particularly so, due to the necessity for completing the annealing within a few feet of travel of the glass through the machine.

The purpose of the improved control of the rate of cooling of the glass sheet or ribbon during the drawing and annealing thereof is to produce glass which has a minimum of transverse curvature, optimum optical characteristics resulting from more uniform thickness of the sheet, a substantially uniform overall residual stress pattern and improved cutting characteristics.

It has been found that the residual stress present in annealed glass is a function of the time the glass is kept within its annealing temperature range and the manner in which the glass is cooled through said range. There is an optimum range of residual stress in glass which renders the glass most suitable for cutting. High stress values tend to increase cutting difficulties by increasing the tendency of a running fracture to depart from a score line made by a cutting tool. Stress values which are too low indicate the glass is too well annealed and the latter is said to be dead and likewise difficult to cut.

While it is desirable to maintain the drawn glass for at least a minimum period within the annealing range, the rate of cooling the glass both above and below the annealing range does not substantially affect the residual stress values present in the annealed glass. It has been demonstrated that the flatness of the annealed glass is improved by reducing the temperature gradients within the glass being drawn, both from edge to edge and from surface to surface, and that the stresses due to cooling the glass being annealed are minimized by controlling the center to surface temperature gradient.

A primary object of the present invention is to anneal glass by improved control of the rate at which the glass cools at various temperatures and especially, in the annealing range, to provide the annealed glass with an optimum stress for cutting.

It is another object of the present invention to provide an annealing section for use in the manufacture of glass wherein the rate of cooling of the glass is controlled so that the glass is cooled very rapidly from its molten state to a temperature substantially at the upper limit or top of the annealing temperature range, held at the top of the range for a short time, then cooled slowly but at an increasing rate through the range, and then cooled comparatively rapidly below the range, to produce annealed glass having a desirable, residual stress pattern.

Another object of the present invention is to provide window glass having hitherto unobtainable flatness by effective control of temperature gradients across the width and through the thickness of a sheet of window glass being formed in a window glass drawing machine.

Another object of the present invention is to provide a vertical annealing section in a drawing machine for use in the manufacture of window glass wherein the rate of draw of the window glass is increased over the rate presently available, and simultaneously, wherein a window glass of improved characteristics is made possible.

Another object of the present invention is to provide a novel annealing lehr structure in which the cooling effect is determined by variations in the temperature of any given cross-section of glass ribbon as the cross-section passes through the lehr and to provide a cooling rate for the glass that conforms as closely as possible to an ideal annealing for obtaining the desired glass characteristics.

Another object of the present invention is to provide a controllable cooling element made up of a series of pipes conveying moving cooling fluids and interspaced heating elements such that the cooling effect imparted by the moving fluids may be suitably regulated by controlling the energy input to the heating elements.

Another object of the present invention is to provide within an annealing lehr, a feed back system to control the temperature of the glass sheet at any point within the lehr.

Another object of the present invention is to provide, in a horizontal or vertical annealing lehr, a system for controlling the temperature of the glass as it passes a series of check points within the lehr during the annealing process to provide a cooling curve for the glass that conforms as closely as possible to a theoretical cooling curve designed to impart a desired stress pattern to the annealed glass.

Yet another object of the present invention is to provide an improved apparatus for annealing glass wherein the glass is rapidly cooled to the upper limit of its annealing range, its center to surface temperature gradient minimized at that limit and then gradually increased with increasing rapidity as the glass is cooled through its annealing range to provide the annealed glass with an optimum residual stress pattern in the shortest possible distance of travel.

These and other objects of the present invention will become apparent upon further study of the following description of a typical structural embodiment of the present invention taken in connection with the accompanying drawings.

In the drawings:

Figure 4 is a chart showing an ideal cooling curve for vertically drawn sheet glass wherein the temperature of the surfaces of the vertically drawn glass sheet is compared with its vertical position in a vertically disposed annealing lehr during its upward travel in the lehr;

In order to achieve the objects of the present invention, the cooling of drawn glass is controlled so that the glass is rapidly and uniformly cooled from the molten state to the upper limit of the annealing range and subsequently cooled through its annealing range in such a manner that the glass is properly annealed to the degree required for the glass to be cut easily in a subsequent operation.

The temperature of a sheet of glass is rapidly and uniformly cooled to the upper limit of the annealing range by a plurality of coolers and differential coolers, the latter being described below as including water cooled pipes and heating elements. The cooling effect of the latter is regulated by means of electric circuits. Each circuit utilizes a thermo-responsive element trained on a portion of the surface of the rising glass sheet to control the current flow in a resistance heater by means of an arrangement that may include a saturable reactor and a feed back circuit.

Additional heating elements are provided in the region where the glass temperature is within the annealing range. The operation of each additional heating element is controlled by the action of a circuit comprising a temperature responsive switching means, a saturable reactor and a feed back circuit. Each temperature responsive means is trained on a different surface area of the plane defining the travel of the glass sheet and is adjusted to provide the temperature desired for the glass sheet surface at that area. By such a device, the glass sheet may be maintained at a fixed temperature, such as the top of its annealing range (for example, 1025° F.), for a desired period to permit equalization of the temperature of the glass throughout its thickness. Then the sheet is cooled through and below its annealing range in conformity with the optimum cooling curve as it continues its rise. Cooling below the annealing range may be accelerated by the provision of additional cooling elements with or without an associated heater to modify the cooling effect. The final stress of window glass so annealed is reduced to approximately 20% to 30% of the stress present in window glass manufactured by utilizing uncontrolled machines.

Figure 1:
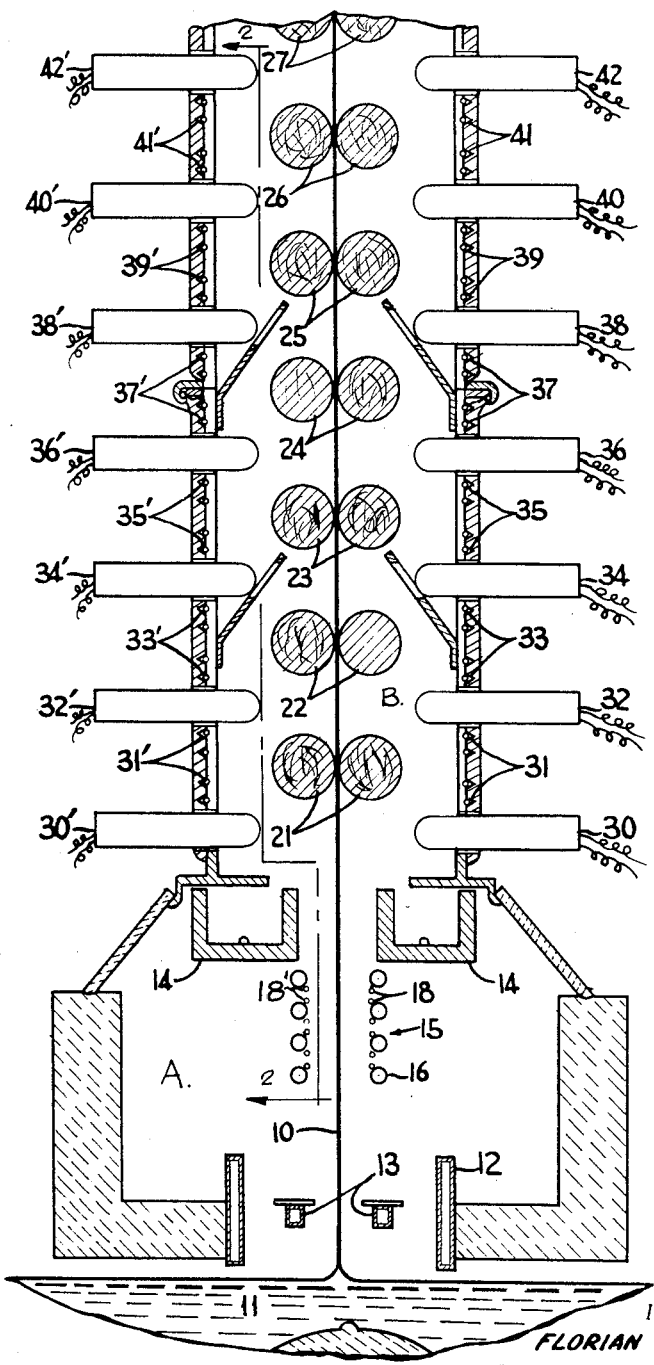
Figure 1 is a vertical section, partially diagrammatic view, of a drawing apparatus, showing a typical structural configuration of control elements utilized in controlling the glass sheet temperature as a glass sheet is drawn vertically upward.
Figure 2:
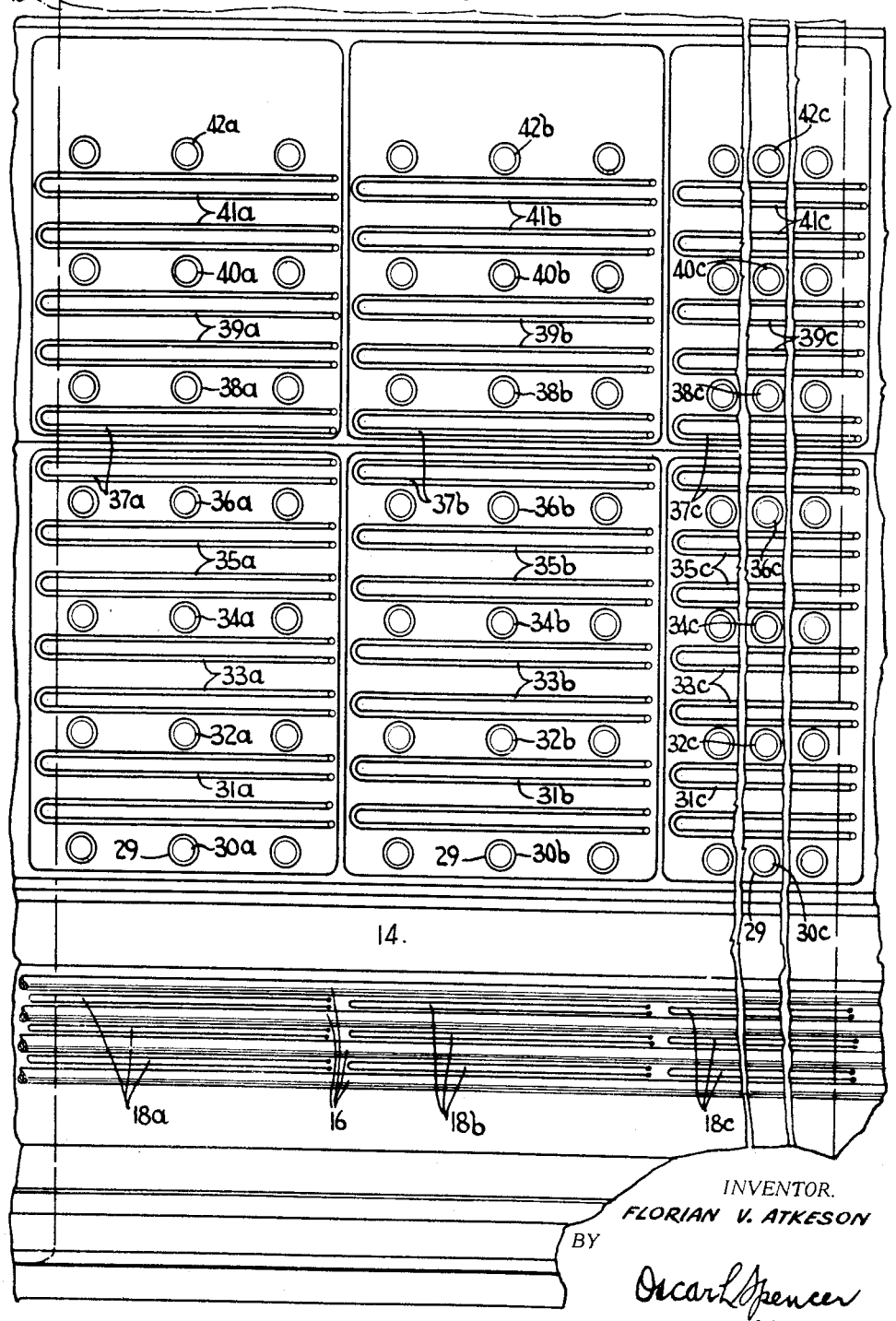
Figure 2 is a view taken along the line 2—2 of Figure 1 with some parts removed.
Figure 3:
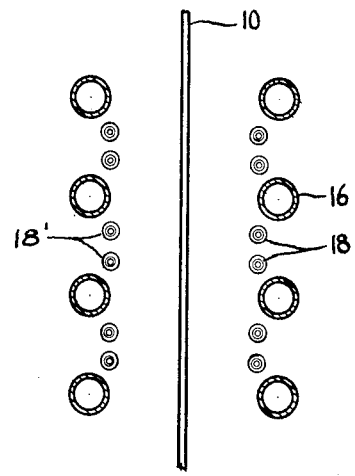
Figure 3 is an enlarged cross-sectional view of a portion of the apparatus as shown in Figure 1 that includes the cooling means utilized to cool the vertically drawn sheet glass rapidly from its molten bath temperature to the upper region of the annealing range and which forms a novel structural element in a typical embodiment of the present invention.

Referring to Figures 1, 2 and 3, wherein a vertical annealing lehr is disclosed, a sheet of glass 10 is drawn upwardly from a bath of molten glass 11 contained in a drawing kiln or chamber A in accordance with present conventional drawing methods. Immediately above the molten glass bath, conventional cooling means such as coolers 12, baby coolers 13 and water cooled catch pans 14 are provided.

A series of novel differential coolers 15 including a series of water cooled pipes or tubes 16 and a series of heating elements 18 is additionally included in chamber A to provide sufficient cooling to have the vertically drawn sheet glass reach a desired temperature, namely, that of the top of its annealing range, 1025° F., at a desired elevation, for example, between the first pair of drawing rolls 21 and the second pair 22 of a series of paired drawing rolls 21 to 27, inclusive, in a chamber B above chamber A and to insure a minimum temperature gradient across the width and through the thickness of the glass sheet 10 at that elevation.

The heating elements 18 contained in the differential coolers 15 are arranged in two sets, generally indicated in Figs. 1, 3 and 4 as 18 and 18', of three independently controlled circuits. In Fig. 2, the three heating elements 18a, 18b, and 18c of the circuits of set 18 are shown. Each of the two sets of circuits is located to face an opposing surface of the rising sheet 10. Each of the heating elements in each of the three independently controlled banks are mounted between adjacent water cooled elements or pipes 16 which are cooled by continuously flowing water. Current in the various heating elements 18a, 18b and 18c is supplied in response to thermo-responsive control elements such as thermo-responsive elements 30a, 30b and 30c, respectively, which are directed toward the surface of the glass and supply thermally responsive switching means for the transmission of current through the various heater elements.

The thermo-responsive elements 30, 30' utilized for this purpose are aimed at the glass surface through a series of sets of ports 29 on each side of the glass. The lowermost set of thermo-responsive elements 30, 30' is sighted on areas of the glass sheet located immediately below the rollers 21 and controls the current flow in the heating elements of circuits 18.

By dividing each horizontal set of thermo-responsive elements into three independently controlled circuits, the temperature of the central portion and each end portion of the vertically rising sheet surfaces can be independently controlled on each side of the vertically drawn sheet. This maintains a very close control of the temperature of the cooling glass. The temperature gradient from edge to edge and from surface to surface of the glass sheet can be kept at a minimum. Also, the height above the molten glass bath at which the vertically drawn sheet reaches a predetermined temperature corresponding to the top of the annealing range is regulated.

The thermo-responsive elements are constructed with specially designed filters responsive only to the 4 to 8 micron wavelength band of infra-red radiation. At this wavelength, glass is opaque so that the thermo-responsive element trained on one surface area of the glass "reads" the temperature radiated by the glass surface only and is not responsive to heating elements located on the other side of the vertically drawn glass sheet. The thermo-responsive elements each comprises a mirror, a thermopile at the focal point of the mirror, and an electric circuit actuated in response to the thermopile. To filter out radiation other than the desired four to eight micron wavelength band, a diffusion type band filter is used between the mirror and the thermopile. Such devices are well known in the art and their structural details are not part of my invention.

Once the glass sheet enters the annealing range somewhere between the first and second set of drawing rolls, its temperature is controlled by six additional horizontally aligned sets of thermo-responsive elements 32, 34, 36, 38, 40 and 42 located at six different elevations of the vertical lehr. Each horizontally aligned set of thermo-responsive elements has its counterpart, 32', 34', 36', 38', 40' and 42' reading temperatures on the opposite glass surface. The thermo-responsive elements control the amount of heating imparted to the glass at different elevations by the banks of heating elements 31, 33, 35, 37, 39 and 41, and 31', 33', 35', 37', 39' and 41', respectively. Each bank of heating elements contains three electric heaters opposite each surface of the rising glass sheet.

The heat imparted by each heating element is controlled by an independent electrical circuit containing a thermo-responsive element that is preset to supply heat when the surface temperature in the area on which the associated thermo-responsive element is focused falls below a desired temperature. Thermo-responsive elements 32a, 32b and 32c control the amount of current supplied to heating elements 31a, 31b and 31c located at one edge portion, the central portion and the other edge portion of one side of the vertically drawn sheet, respectively, and a similar arrangement of thermo-responsive elements (not shown) and heating elements (not shown) are aligned in the same plane on the opposite side of the sheet. Thermo-responsive elements 34a, 34b and 34c control the current supplied to heating elements 33a, 33b and 33c, respectively, at the next higher level of ports, etc.

The control of each heating unit, whether contained in the differential cooler 15 utilized to cool the glass rapidly to the upper temperature of the annealing range or to slow down the cooling of the glass through the annealing range, is independent of the control for every other unit. Thus, at each plane at which the temperature is controlled, there are six independent heating circuits for controlling the temperature of the glass passing through that plane. By careful adjustment of the input to a series of heating elements by means of saturable reactors at each plane, the vertically drawn glass can be made to cool in rather close conformity to the idealized cooling curve shown in Figure 4.

In this figure, an idealized cooling curve for window glass above, through and below its annealing range is shown. The glass is cooled to the upper limit of the annealing range at a vertical position corresponding to the position of the second horizontally aligned series of thermo-responsive elements 32 and 32' located between the first and second set of drawing rolls. Cooling of the drawn glass is obtained in chamber A by means of the main coolers 12, baby coolers 13 and water cooled catch pans 14 as well as the differential coolers 15 disclosed in detail in Fig. 3. An attempt is made to keep the temperature of the vertically drawn window glass sheet close to the upper limit of the annealing range until approximately the position of the third set of drawing rolls 23 to enable the temperature gradients within the glass to be minimized at this temperature.

For glass having a thickness of .120 inch, only 4.45 seconds are required to reduce a 100° F. temperature differential between the surface and center of a glass sheet to 5° F. at a temperature of 1025° F. This is far less than the time consumed in the vertical travel of the glass through the portion of the lehr utilized for temperature equalization.

Above the third set of rolls, the rate of cooling of the glass is gradually increased until the temperature of the upwardly moving sheet crosses the minimum temperature of the annealing range at approximately the level of the sixth set of drawing rolls 26. The rate of cooling the glass through the annealing range is carefully controlled by the settings of the various thermo-responsive elements.

Figure 5:
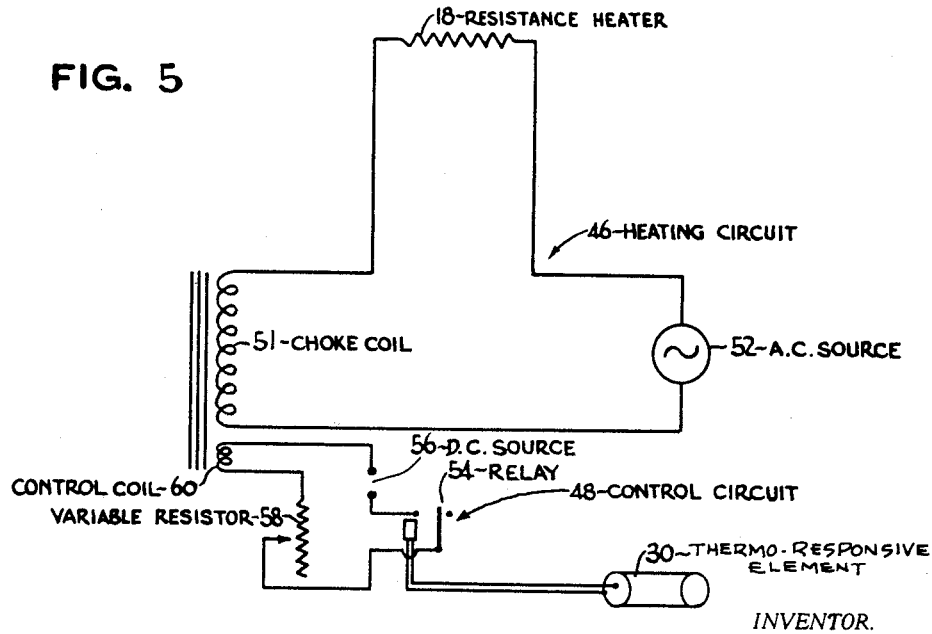
Figure 5 is a schematic electrical circuit diagram of a typical electrical control circuit useful with the present invention.

Figure 5 shows a schematic circuit diagram of an electrical circuit suitable for use in controlling the temperature of the rising glass sheet at any localized area along the vertical plane of drawing of the glass. A typical circuit, the specific details of which form no part of the present invention, comprises a heating circuit 46 containing a heating element 18, a choke coil 51 and a source of alternating current energy 52, and a control circuit 48 comprising a thermo-responsive element 30, a relay switch 54 responsive to the activation of the thermo-responsive element in response to a temperature variation, a source of direct current 56 (shown as a dry cell, but which may be a rectifier unit), a manually controllable rheostat 58 and a control coil 60.

When no current is flowing through the control circuit, alternating current from source 52 that passes through the heating coils 18 contained in the heating circuit is at a minimum, since the dimensions of the choke coil 51 are such to provide a desired maximum potential opposing the voltage supplied from source 52. When the temperature in the area upon which the thermo-responsive element 30 is trained falls to a predetermined level, the relay switch 54 is actuated thereby causing current to flow in the control circuit.

The current flow in the control circuit unbalances the heating circuit, and lessens the effect of the choke coil 51 on the voltage being supplied to the heating circuit from the source 52. An increased voltage results across the heating element 18 until such time as the heat imparted by the heating element causes the temperature in the area scanned by the thermo-responsive element 30 to rise above the desired level. When this happens, relay switch 54 is deactivated and no current flows through the control circuit, thereby resulting in a resumption of the status of the heating circuit 46 that prevailed prior to the activation of the relay 54. The adjustment of the potentiometer 58 determines the change in amount of heat that is supplied by the heating element 18 upon activation of the control circuit, since the greater the current flowing through the control circuit the greater is the imbalance imparted to the heating circuit. The aforementioned operation is typical of the functioning of a commercial saturable reactor circuit.

By maintaining a minimum of six heating circuits, each controlled independently of the others by the surface temperature of the glass sheet at six different locations all at the same plane, and setting the individual thermo-responsive elements controlling each heating circuit at the same elevation to be responsive at the same temperature, the temperature from side to side and between the surfaces of the sheet is kept at a constant level, thus attaining minimum internal stresses due to temperature gradients within the sheet and consequently, the production of a flat sheet of window glass.

One of the factors determining the optimum temperature for annealing the rising sheet of glass is the dimensions of the sheet. Since the width of the drawn sheet is kept constant, the only variable dimension that need be considered is the thickness of the sheet drawn from the molten bath.

The rate of draw of the sheet and the temperature at which it is drawn determine its thickness. Generally, the thickness varies inversely as a logarithmic function of the speed and temperature of draw. By rapidly cooling the sheet immediately above the molten bath, a sheet of a given thickness may be drawn at a more rapid rate than has been possible before. The rate of draw has been a limiting factor in the amount of window glass produced. Hence, by providing a means for accelerating the rate of draw, the productivity of window glass making furnaces may be increased.

Since the time required to anneal a thin sheet obtained by a relatively rapid draw is less than that required for annealing a thicker sheet which is obtained by a slower rate of draw, the difference in vertical distance travelled by glass sheets of various thicknesses during the optimum minimum time required for annealing is very slight. The optimum annealing temperature ranges of sheets of various thicknesses presently produced are substantially identical. Therefore, the location of the critical zone within the lehr required for optimum annealing of a glass sheet of average thickness does not vary too greatly from that required for the widest variations of thicknesses of glass drawn. Since no harm is done in maintaining the glass sheet at the top of its annealing range for a period slightly in excess of the minimum time required for annealing, it is possible to preset the thermo-responsive element reactor circuits in each set of heating circuits to provide a uniform cooling curve of temperature versus elevation level within the annealing section of the drawing machine that corresponds substantially to a theoretical cooling curve designed to produce an optimum cutting stress within the glass for the entire range of thicknesses produced.

In practice, as shown in Figure 4, the annealing interval is best described as the cross-hatched area 50 under the annealing curve. Area 50a represents the equalizing portion of the annealing interval wherein the lehr temperature is held constant at the top of the annealing range in order to minimize the temperature gradient between the center and the surfaces of the rising sheet. Area 50b represents the cooling portion of the annealing curve. Efficacy of annealing is proportional to the total area 50 with due consideration for both the preliminary equalizing interval 50a and the shape of the cooling portion 50b.

In other words, the amount of residual stress that remains in annealed window glass is an inverse function of the time the glass is kept within the optimum annealing temperature range. Furthermore, the time required to obtain an optimum annealing stress pattern in annealed glass increases with the temperature differential existing between the temperature curve through which the glass is actually annealed and the optimum annealing temperature curve. For commercial purposes, the area 50 as seen in Fig. 4 should be the maximum possible obtainable at least the minimum required for proper anneal, in the smallest possible time interval.

It is also quite important that there be a minimum of temperature gradient both across the width and a minimum of temperature difference for the surfaces of the glass sheet, since the presence of any temperature gradient manifests itself in internal stresses resulting in a distortion of the glass. Thus, in order to obtain flat glass, the minimization of temperature variations at the equalizing temperature across the width and through the thickness of the glass sheet is imperative.

It has been determined that it is unnecessary to maintain the center to surface temperature gradient obtained in the equalization range 50a of Fig. 4 at a constant value during the subsequent cooling of the glass through the annealing range as shown in area 50b. This discovery enables the glass ribbon to be controllably cooled through its annealing range while the glass is travelling a much shorter distance than would be necessary to cool the glass over the same temperature range while maintaining a constant temperature gradient between the center and the surface of the glass ribbon. At the same time, virtually no harmful effects such as an increase in stress occur when the center to surface gradient is allowed to increase within controlled limits as the glass is cooled through its annealing range.

This result is believed to be obtained because the importance of the upper portion of the annealing range in producing residual stress patterns in the glass is greater than the lower portion of the annealing range due to the rapid increase in viscosity of glass from the upper to the lower limit of the annealing range. This rate of increase in viscosity through the annealing range is an exponential function. For example, in typical plate and window glass having the following chemical compositions, the viscosity in poises at the upper and lower limits of the annealing range is as follows:

|  | Typical Plate Glass | Typical Window Glass |
|---|---|---|
| $SiO_2$_____percent__ | 71.57 | 72.65 |
| $Na_2O$_____do__ | 13.13 | 13.18 |
| $CaO$_____do__ | 11.62 | 8.47 |
| $MgO$_____do__ | 2.54 | 3.64 |
| $Na_2SO_4$_____do__ | .72 | .49 |
| $NaCl$_____do__ | .12 | .12 |
| $Fe_2O_3$_____do__ | .12 | .12 |
| $Al_2O_3$_____do__ | .20 | 1.33 |
| Upper Limit of Annealing Range_____° F__ | 1,035 | 1,025 |
| Viscosity at Upper Limit_____poises__ | $10^{13.0}$ | $10^{12.0}$ |
| Lower Limit of Annealing Range_____° F__ | 935 | 920 |
| Viscosity at Lower Limit_____poises__ | $10^{15.4}$ | $10^{15.3}$ |

From the above table, it is evident that the viscosity increases by a factor of 200 to 300 between the upper and lower limits of the annealing range. As distortions causing residual stresses are more easily produced in lower viscosity glass than in glass of higher viscosity, the comparative importance of the temperature gradients in the glass at the different temperatures within the annealing range is apparent.

While the center to surface gradient obtained in the equalization area of the controlled cooling curve shown in Fig. 4 varies with the thickness of the glass formed, the same principles utilized in controlling the increase in temperature gradient of a glass of one thickness are necessarily followed in controllably cooling glass of different thicknesses and compositions through their annealing ranges. The following figures are exemplary of a typical glass thickness for drawn window glass. For window glass ⅛″ thick having at 50° F. center to surface gradient above the annealing range, the center to surface gradient is reduced in area 50a to between 2 and 3° F. This gradient is maintained as the glass is slowly cooled through the upper portion of the annealed range, then gradually increased with increasing rapidity as the temperature is reduced to the lower limit of the annealing range. The temperature gradient is so controlled that at the lower end of the annealing range, the center to surface gradient does not exceed 30° F.

The determination of the center to surface gradients in glass have been made by measuring the surface temperature and the mean temperature of the glass. These values are utilized to calculate the temperature at the center of the glass by means of differential equations which have been developed and which are not part of the present invention.

It is understood that the complete elimination of a temperature gradient through the thickness of the glass sheet from one surface to the other is not practical, especially when an attempt is made to draw the sheet upwardly from the molten bath to a location wherein the optimum annealing temperature of the glass is attained in the shortest distance possible. However, by maintaining a uniform surface temperature from one side of the glass sheet to the other on both surfaces thereof, the task of providing a cooling effect on the glass such that internal stresses tend to cause minimum warpage and inhomogeneities of the glass is simplified, and the calculation of this optimum cooling curve for the various thicknesses of glass to be drawn may be accomplished with relative facility. Once this curve has been established, the problem of obtaining the proper adjustment of the various thermo-responsive elements to provide a proper cooling effect to the glass is readily accomplished.

Figure 6:
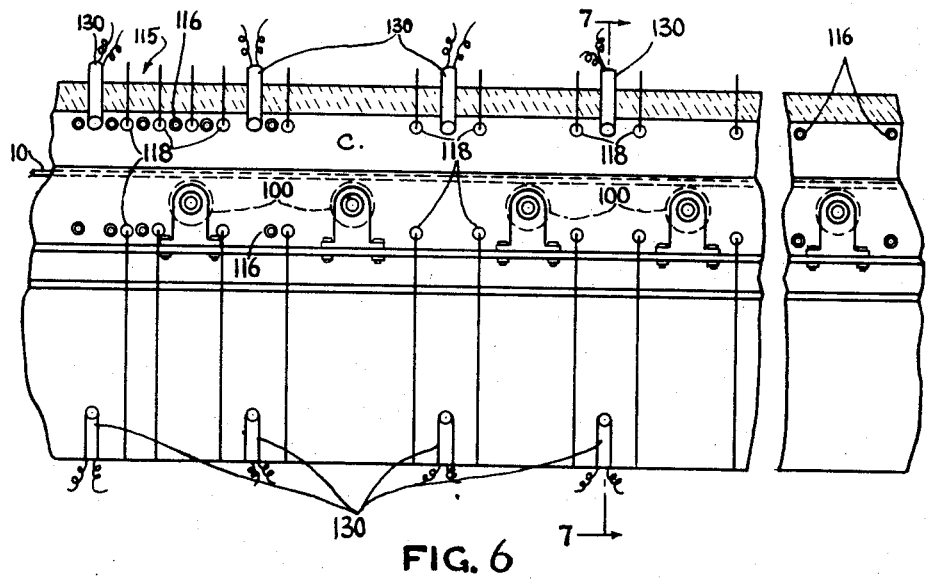
Figure 6 is a side elevation of a portion of a horizontal lehr with side wall removed and showing diagrammatically temperature control elements for controlling the temperature of a horizontally conveyed glass sheet as the glass passes through various check points within the annealing lehr in accordance with the teaching of the present invention.
Figure 7:
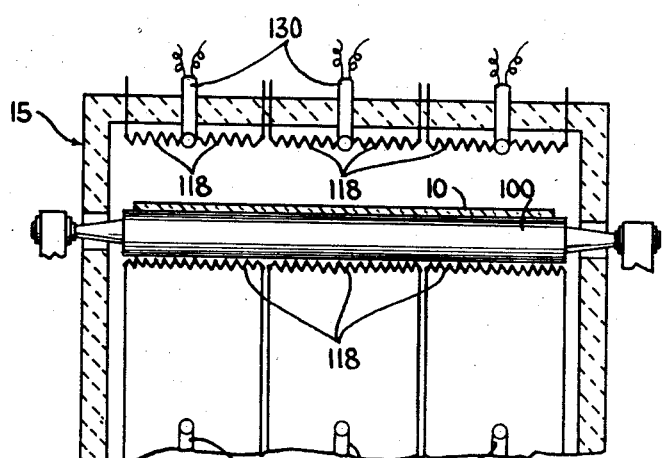
Figure 7 is a cross-sectional view of the lehr taken along the lines 7—7 of Figure 6.

Referring to Figures 6 and 7, a typical horizontal annealing lehr or chamber provided with temperature control elements for controlling the temperature of a horizontally conveyed glass ribbon 10 is shown. A plurality of conveyor rolls 100 are provided to support the under surface of the horizontally conveyed glass ribbon 10. The rolls convey the ribbon horizontally through a first section of the lehr where the temperature exceeds the annealing range of the glass, a second section of the lehr where the temperature is within the annealing range, and, finally, a third section where the temperature is below the annealing range.

In the first section of the lehr, a plurality of differential coolers generally indicated at 115 is provided above and below the glass sheet. Differential coolers 115 are similar to the differential coolers 15 shown in the vertical annealing lehr and comprise a series of water cooled pipes or tubes 116 and a series of electrical heating elements 118. The purpose of the differential cooler 115 is the same as that of differential cooler 15. The amount of current supplied to heating elements 118 is controlled by thermo-responsive elements 130 trained on localized areas of the glass surface. This current heats the elements 118 to modify the cooling effect of the cooling tubes 116 in the first section of the lehr.

In the second section of the lehr, when the glass ribbon 10 is cooled to the upper end of the annealing range, sufficient additional heat is imparted by means of additional thermo-responsive elements 130 each controlling its adjacent additional heating elements 118 to provide first, a minimization of temperature gradients throughout the thickness of the glass sheet at a temperature approximately equal to that of the upper limit of the annealing range and secondly, to control the rate of cooling of the glass through the annealing range, in a manner similar to that described previously for the vertical lehr. In practice the heating elements do not heat the glass. They merely act as controllable thermal barriers by means of which heat loss from the glass is accurately regulated.

The glass ribbon may be cooled rapidly in the third section of the horizontal lehr, where the glass temperature is below the annealing range of the moving glass sheet.

The rotating conveyor rolls 100 in the lehr have a cooling effect on the glass sheet. This effect is taken into consideration in the location of cooling tubes 116 and heating elements 118. Each of the upper cooling tubes 116 and upper heating elements 118 is positioned at a distance above the upper surface of the glass ribbon and each of the correspondingly opposite lower cooling tubes 116 and lower heating elements 118 is positioned a distance below the lower surface of the ribbon so that the upper and lower major surfaces of the ribbon are cooled at the same rate.

By increasing the rate of cooling of a ribbon of glass that is conveyed through an annealing lehr in the regions of the lehr where the temperature is above and below the annealing temperature range for the glass, the length of the lehr is substantially reduced. This reduction in lehr length provides considerable economy in the operation of a glass plant, since space is at a premium in most industrial establishments.

Typical structural assemblies of a vertical and a horizontal annealing lehr embodying a plurality of check points for conforming the temperature of a glass sheet or ribbon to the desired temperature required for a theoretical cooling curve as the glass passes each check point have been described. It is understood, however, that various modifications of structure that are readily apparent to a mechanic skilled in the art will become obvious upon study of the present disclosure. The scope of this invention should not be limited to the specific details of the particular embodiment described herein for purposes of illustration only but should be expanded to include the matter recited in the appended claims.

This application is a division of my copending patent application, Serial No. 355,815, filed May 18, 1953, now Patent No. 2,774,190, issued December 18, 1956, and entitled Annealing Glass.

I claim:

1. In an apparatus for drawing a continuous ribbon of glass and cooling the glass ribbon, a drawing chamber for a molten glass bath, an annealing lehr, means for drawing a continuous ribbon from the molten glass bath and for moving the continuous glass ribbon through the annealing lehr, fluid coolant pipes mounted in the drawing chamber above the molten glass bath on each side of the path traversed by the moving glass ribbon, said pipes extending transversely in the drawing chamber, transversely spaced heater means in the drawing chamber between the pipes and on each side of the glass ribbon, each heater means opposing a portion of the glass ribbon, and means for separately controlling and adjusting the heat output of said transversely spaced heater means.

2. The apparatus of claim 1 wherein the means for adjusting the heat output of the heater means includes means mounted in the annealing lehr adjacent the drawing chamber for measuring the infrared radiation of the portion of the glass ribbon corresponding to the portion of the glass ribbon opposing the heater means adjusted in heat output by said adjusting means.

3. In apparatus for drawing a continuous ribbon of glass and cooling the glass ribbon, a drawing chamber for a molten glass bath, an annealing lehr, means for drawing a continuous ribbon from the molten glass bath and for moving the continuous glass ribbon through the annealing lehr, fluid coolant pipes mounted in the drawing chamber above the molten glass bath on each side of the path traversed by the moving glass ribbon, said pipes extending transversely in the drawing chamber, a first electric heater opposing one surface of the central portion of the glass ribbon, a second electric heater opposing the other surface of the central portion of the glass ribbon, a third electric heater opposing one surface of a first flanking portion of the glass ribbon, a fourth electric heater opposing the other surface of the first flanking portion, a fifth electric heater opposing one surface of a second flanking portion of the glass ribbon, a sixth electric heater opposing the other surface of the second flanking portion of the glass ribbon, said electric heaters being mounted in the drawing chamber between said fluid coolant pipes, and means for separately adjusting and controlling operation of said first through sixth electric heaters.

4. The apparatus of claim 3 wherein said means for separately adjusting and controlling said first through sixth electric heaters includes a separate switching means adapted to independently control the electric input to each of said electric heaters, each of said switching means including means for measuring the infrared radiation of the surface of the portion of the glass ribbon opposing the electric heater controlled by said switching means.

5. The apparatus of claim 4 wherein the means for measuring the infrared radiation of each of the portions of the glass ribbon are mounted to be trained on the glass portions in the annealing lehr in the region closest to the drawing chamber.

6. The apparatus of claim 5 and further including first through sixth electric heaters in the annealing lehr, said electric heaters being transversely spaced on each side of the glass ribbon in the manner of the first through sixth electric heaters mounted in the drawing chamber to separately oppose central and flanking portions of the glass ribbon, and switching means to control separately the amount of electric current to each of the first through sixth electric heaters in the annealing lehr, said separate switching means controlling the electric heaters in the annealing lehr including means for measuring separately the infrared radiation of the portions of the glass ribbon.

References Cited in the file of this patent

UNITED STATES PATENTS 1,525,132    Hitchcock _____ Feb. 3, 1925

(Other references on following page)

UNITED STATES PATENTS

| | | |
|---|---|---|
| 1,657,797 | Henry et al. | Jan. 31, 1928 |
| 1,866,366 | Mulholland et al. | July 5, 1932 |
| 1,868,856 | Sylvester | July 26, 1932 |
| 1,870,002 | Eckert | Aug. 2, 1932 |
| 1,999,588 | Fox et. al. | Apr. 30, 1935 |
| 2,026,781 | Greer | Jan. 7, 1936 |
| 2,417,094 | Spinasse | Mar. 11, 1947 |
| 2,491,828 | Otis | Dec. 20, 1949 |
| 2,556,349 | Trautman | June 12, 1951 |

FOREIGN PATENTS

| | | |
|---|---|---|
| 418,059 | Great Britain | Oct. 17, 1934 |
| 475,181 | Great Britain | Feb. 10, 1936 |